March 31, 1964  F. W. LÜCK  3,126,755
ROTARY PISTON ENGINE
Filed July 27, 1960  2 Sheets-Sheet 1

Inventor:
Friedrich W. Lück
By Walter Berlin
Patent Agent.

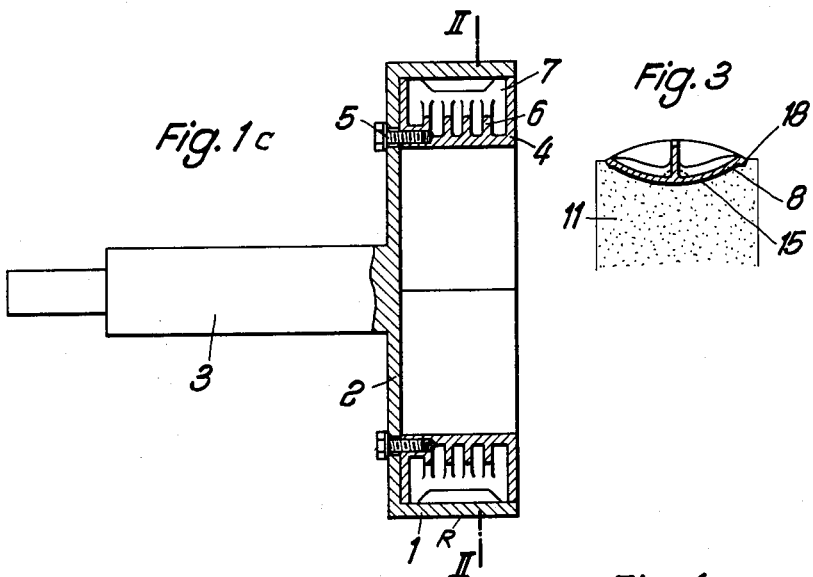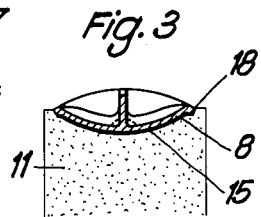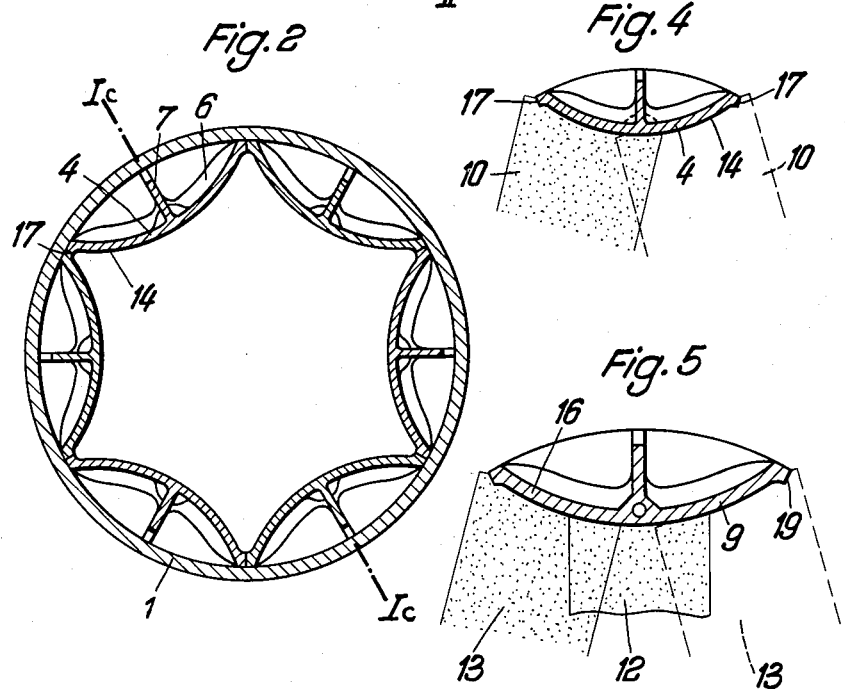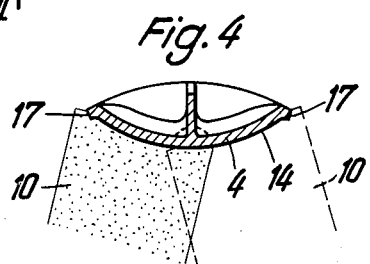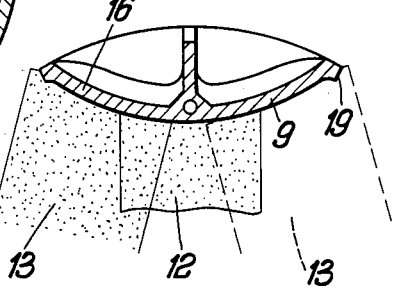

United States Patent Office 3,126,755
Patented Mar. 31, 1964

3,126,755
ROTARY PISTON ENGINE
Friedrich W. Lück, Berlin-Tegel, Germany, assignor to Borsig Aktiengesellschaft, Berlin-Tegel, Germany, and Wankel G.m.b.H., Lindau (Bodensee), Germany
Filed July 27, 1960, Ser. No. 45,690
Claims priority, application Germany Aug. 6, 1959
6 Claims. (Cl. 74—457)

The present invention relates to rotary piston engines with eccentrically journalled continuously intermeshing rotary pistons in which the outer rotary piston which is floatingly journalled is composed of a cylindrical section, end disc and a stud, said cylindrical section surrounding a thin-walled insert provided with teeth. Inasmuch as with engines of this type one of the rotary pistons, usually the inner rotary piston, is directly moved by the other rotary piston, utmost precision of the cycloidal guiding surfaces of the outer rotary piston is required in order to keep the running noise and tooth wear at a minimum.

A design of the outer rotary piston is known which makes possible a manufacture of the teeth by planing, slotting, milling or grinding. Thus, for instance, by means of a hob cutter replacing the inner rotary piston and rolling at low feed on the outer rotary piston, a very precise tooth shape may be produced. However, it has been found that this method is rather expensive because the machining time is, due to the small feed, rather long. In order to overcome this defect which makes itself particularly felt with small rotary pistons, the present invention provides a machining method according to which the guiding surface and the pushing surfaces of the individual rotary tooth are produced by means of profile grinding discs, the outer rotor being divided into individual teeth which are individually ground.

It is, therefore, an object of the present invention to provide a rotary piston engine of the above mentioned general type, which will overcome the drawbacks outlined above.

It is another object of this invention to provide a rotary piston engine as set forth in the preceding paragraph which can be machined at high precision in a highly efficient and economic manner.

These and other objects and advantages of the invention will appear more clearly from the following specification in connection with the accompanying drawing, in which:

FIG. 1b is a vertical section through a rotary piston engine and is indicated by line 1b—1b on FIGURE 1a.

FIG. 1c is a vertical sectional view through the outer rotary piston of the engine and is indicated by line 1c—1c on FIGURE 2.

FIG. 2 is a vertical transverse section through the outer rotary piston and is indicated by section line II—II on FIGURE 1c.

FIGS. 3, 4 and 5 are transverse sections taken through various forms that the individual teeth of the outer rotary piston can take, said sections being taken through the teeth in the region of the cutting plane II—II in FIGURE 1c.

Figure 1A:
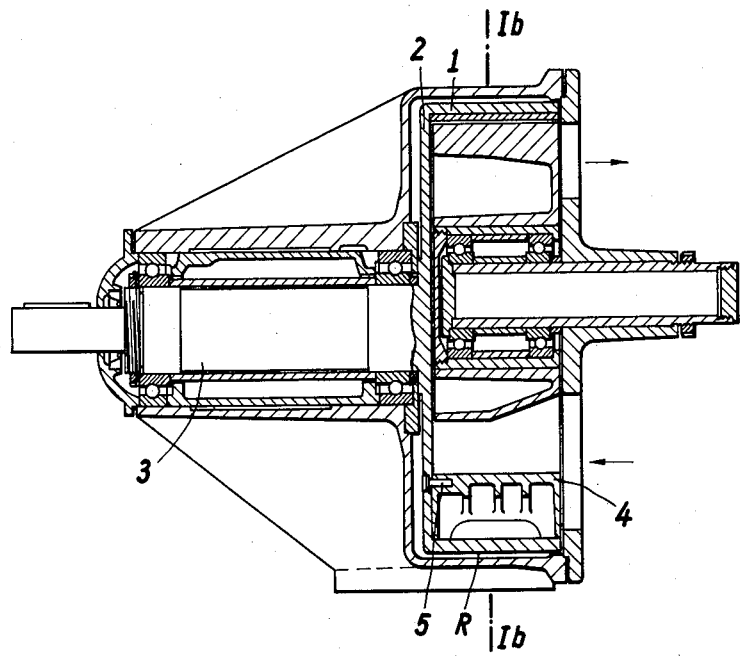
FIG. 1a is a vertical longitudinal section through a rotary piston engine and is indicated by section line 1a—1a on FIG. 1b.

The outer rotary piston for rotary piston engine according to the present invention is characterized primarily in that the outer piston is provided with inserts arranged on the inside of said cylindrical section and forming individual teeth or segments, said inserts being inserted into said cylindrical portion under stress. In conformity with a further development of the present invention, the guiding surfaces and the abutment surfaces of the teeth are machined by means of profiled grinding discs.

Referring now to the drawing in detail, the rotary piston engine illustrated therein comprises an outer rotary piston generally designated R which comprises a cylindrical portion 1, and end plate 2 and a shaft 3, said three elements 1, 2 and 3 being fixedly connected to a single unit. The outer rotary piston of the engine of FIG. 1 furthermore comprises a plurality of uniform teeth or segments 4. These segments have been inserted into the cylindrical portion 1 under sufficiently high stress which stress will still be maintained when the cylindrical portion expands at high rotary speed of the outer rotary piston R. In addition thereto, each segment is by means of one or more screws 5 firmly pulled against the end plate 2 so that the segments firmly engage the adjacent surface of the end plate 2.

The segments 4 are provided with a greater number of ribs 6 and side portions 21, one at each side edge, the ribs and side portions extending in circumferential direction, and are furthermore provided with one or more ribs 7 extending in axial direction. These ribs and side portions are intended for the purpose of protecting the rather thin segments from being deformed or destroyed by gas pressure or foreign bodies, and also have the purpose of maintaining the pressure and bending stresses within proper limits, which stresses are caused by the connection of said segments in the manner described above. The side portions 21 have the additional function to seal off the dead space inside the segments from the working chambers.

Figure 1B:
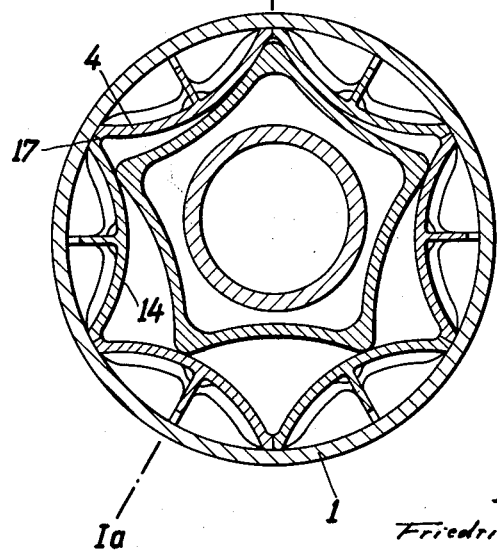

FIG. 4 illustrates an individual segment 4 of the outer rotary piston shown in FIGS. 1 and 2. For purposes of machining the guiding surface 14 and the abutment surfaces 10, preferably a profiled grinding disc 10 is employed in two different positions as indicated in FIG. 4.

FIG. 3 shows a segment 8 of the rotary piston engine of a small design according to which the machining of the guiding surface 15 and the abutment surfaces 18 may be effected simultaneously by a profiled grinding disc 11.

Finally, FIG. 5 shows a segment of a larger rotary piston engine. For purposes of machining the abutment surfaces 19 and the lateral sections of the guiding surfaces 16, there is provided a profiled grinding disc 13 in two different positions. The intermediate section is machined by means of grinding disc 12. Inasmuch as with this type of machining no transverse feeding stroke is required, it is possible to manufacture a homogeneous and groove-free surface which meets the highest requirements with regard to the precision of the tooth pitch.

It is, of course, to be understood that the present invention is, by no means, limited to the particular construction described in connection with the drawing but also comprises any modifications within the scope of the appended claims.

What I claim is:

1. An outer rotary piston provided with inner teeth for use in connection with a rotary piston engine, in which said piston comprises a cylindrical member closed at one end, and a plurality of individual teeth mounted within said cylindrical member in circumferentially distributed relation, each tooth extending substantially the entire axial length of said cylindrical member, said teeth when disposed in said cylindrical member being in a state of circumferential prestress under stress sufficient to maintain a stress on the teeth during operative rotation of said piston.

2. An outer rotary piston provided with inner teeth for use in connection with a rotary piston engine, in which said piston comprises a cylindrical member closed at one end, and a plurality of individual teeth mounted within said cylindrical member in circumferentially distributed relation, each tooth extending substantially the entire axial length of said cylindrical member, said teeth when disposed in said cylindrical member being in a state of circumferential prestress under stress sufficient to maintain a stress on the teeth during operative rotation of said piston, each said tooth having a relatively thin outer wall convex toward the center of said cylindrical member and having the side thereof toward the outside of the cylindrical member provided with first reinforcing ribs extending in axial direction and with second reinforcing ribs extending in radial direction.

3. An outer rotary piston according to claim 2 in which each said tooth has side portions at the side edges of said outer wall curved oppositely to the curvature of said outer wall and fitting in said cylindrical member and abutting the adjacent side portion of the next adjacent tooth.

4. An outer rotary piston according to claim 3 with there being bolt means securing each said tooth to the closed end of said cylindrical member.

5. A method of manufacturing an outer rotary toothed piston having a cylindrical wall and individual tooth segments mounted circumferentially in abutting relation in said wall each formed with a convex guiding surface facing radially inwardly, the steps of grinding the abutting and guiding surfaces of said teeth by profile disks and of inserting said segments into said cylindrical wall under sufficiently high circumferential prestress so that said segments will be maintained in a condition of stress during rotation of said piston.

6. An outer rotary toothed piston comprising a cylindrical wall and individual tooth segments mounted in circumferentially abutting relation in said wall, each of said segments being formed with a substantially convex wall having its convex surface facing radially inwardly and having circumferentially extending reinforcing ribs on its outer surface facing said cylindrical wall, said segments being mounted in said cylindrical wall under high circumferential prestress sufficient to maintain stress during rotation of said piston.

References Cited in the file of this patent

UNITED STATES PATENTS

| | | |
|---|---|---|
| 1,341,846 | Gollings | Jan. 1, 1920 |
| 1,486,340 | Hoke | Mar. 11, 1924 |
| 1,505,707 | Hill | Aug. 19, 1924 |
| 1,989,652 | Drummond | Jan. 29, 1935 |
| 2,721,541 | Nubling | Oct. 25, 1955 |
| 2,740,386 | Crandall | Apr. 3, 1956 |
| 2,753,810 | Quintilian | July 10, 1956 |
| 2,762,339 | Schroeder | Sept. 11, 1956 |

FOREIGN PATENTS

| | | |
|---|---|---|
| 305,665 | Great Britain | Dec. 24, 1929 |